J. M. FEENEY.
EGG BEATER.
APPLICATION FILED JUNE 23, 1921.
1,399,296.
Patented Dec. 6, 1921.
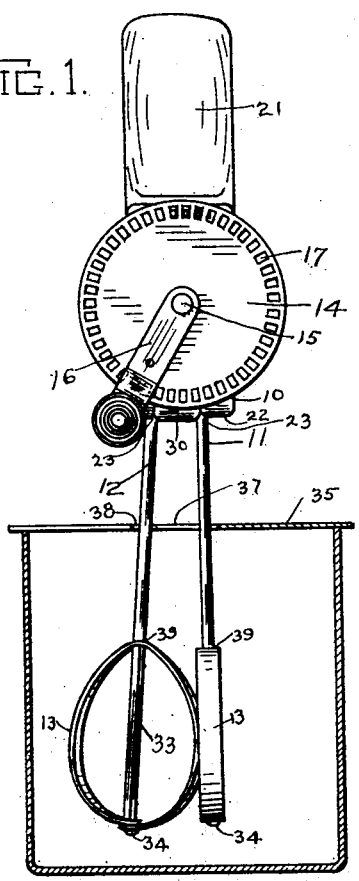
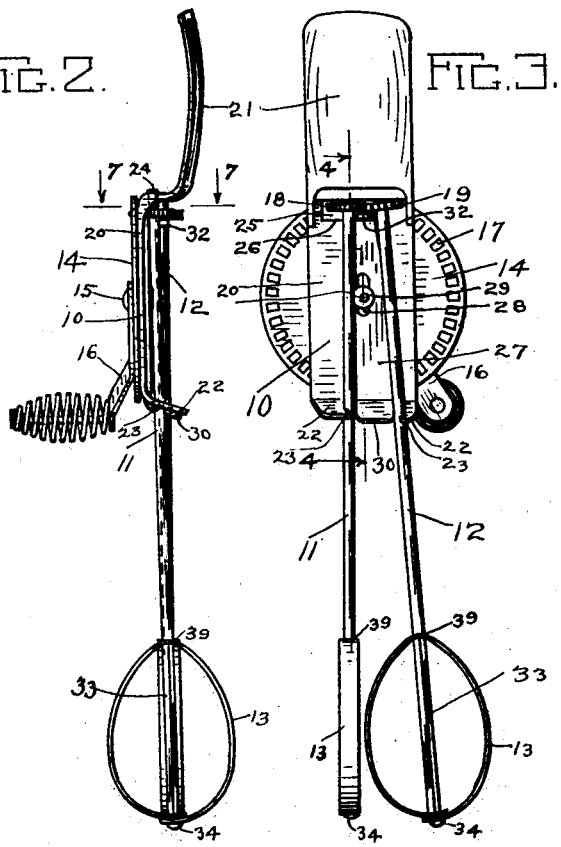
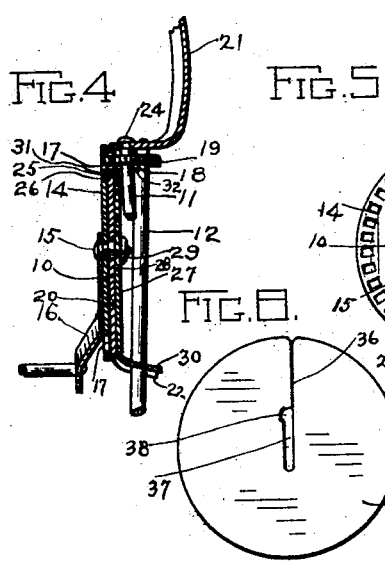
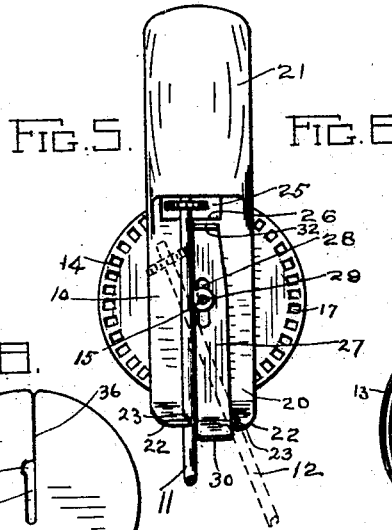
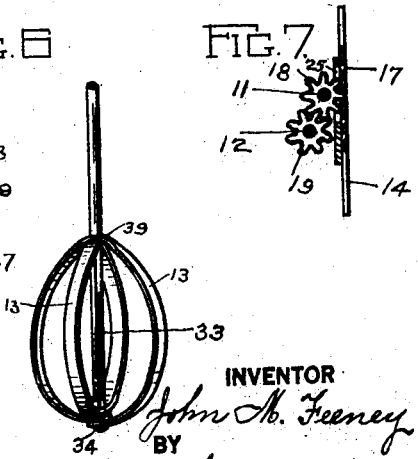
INVENTOR
John M. Feeney
BY
N. M. Wooster
ATTORNEY

UNITED STATES PATENT OFFICE.

JOHN M. FEENEY, OF BRIDGEPORT, CONNECTICUT.

EGG-BEATER.

1,399,296. Specification of Letters Patent. Patented Dec. 6, 1921.

Application filed June 23, 1921. Serial No. 479,895.

*To all whom it may concern:*

Be it known that I, JOHN M. FEENEY, a citizen of the United States, residing at Bridgeport, county of Fairfield, State of Connecticut, have invented an Improvement in Egg-Beaters, of which the following is a specification.

This invention has for its object to provide a simple, inexpensive and thoroughly practical egg and cream beater, which shall be so constructed that the parts may all be made from steel stampings and wire.

A further object of the invention is to produce an egg and cream beater so constructed that one of the paddles may be easily removed so that the implement may be used as a single or double paddle beater and which, when used with either one or two paddles, may be easily and quickly cleaned, the number of parts being reduced to the minimum and all easy of access.

A further object of the invention is to provide an egg and cream beater in which the frame itself shall support the spindles at two points and the usual guard about the paddles is dispensed with, in which the driving wheel shall be simply a flat disk with angular holes to receive the teeth of a pinion, and which shall be provided with a cover plate adapted to conveniently receive the spindles and to cover the vessel in which the material to be beaten is held.

With these and other objects in view I have devised the novel egg and cream beater which I will now describe, referring to the accompanying drawing forming a part of this specification, and using reference characters to indicate the several parts.

Figure 1 is a view, partly in elevation and partly in section, illustrating the use of my novel beater;

Fig. 2, a view of the beater as seen from the right in Fig. 1;

Fig. 3, a view as seen from the rear in Fig. 1;

Fig. 4, a detail sectional view on the line 4—4 in Fig. 3, looking in the direction of the arrows;

Fig. 5, an elevation corresponding with Fig. 3 showing the locking slide in the releasing position, and in dotted lines, a position of the removable spindle when being inserted or removed;

Fig. 6, a detail view of a paddle detached;

Fig. 7, a section on the line 7—7 in Fig. 2, looking in the direction of the arrows; and Fig. 8 is a view of the cover plate detached.

10 denotes the frame, 11 and 12 the spindles, each of which carries a paddle 13, 14 the driving wheel, which is mounted to rotate on a stud 15, rigidly secured in the frame, and is provided with a crank 16 and with angular openings 17, adapted to be engaged by the teeth of pinion 18 on spindle 11.

The frame is broadly U-shaped and comprises an angular offset portion 20, the upper arm of which is provided with holes in which the upper ends of the spindles are journaled, see Fig. 4 in connection with Fig. 7, and above the offset portion with a rounded handle 21. The lower arm of the frame comprises angular lugs 22, each of which is provided in its inner face with a recess 23 to receive one of the spindles. It is an important feature of the invention that both spindles are supported by both arms of the frame. I thus avoid the use of a special support or guide for the spindles. The pinions normally lie just under the offset portion of the frame. The upper ends of the spindles are reduced and pass through the holes in offset portion 20, the upper end of spindle 11 being headed, as at 24 in Fig. 4, to retain the spindle permanently in place. The upper end of the frame is provided with an opening 25 in which pinion 18 lies. The lower wall of said opening, as at 26, see Fig. 5, has an important function which will now be described.

As already stated, spindle 12, with its pinion and paddle, is readily removable from the frame. This spindle is retained in operative position by means of a slide 27, which is provided with a slot 28 through which the stud passes, the end of the stud being provided with a washer 29, wider than the slot, over which the end of the stud is headed to retain it in place. The lower end of the slide is provided with a finger piece 30, which lies between the lugs of the frame and coöperates therewith to lock both spindles in operative position. The slide is made of spring metal and is provided at its upper end with a boss 31 adapted to engage opening 25 in the frame. The slide is formed, in the present instance, by curving and recurving the metal of the slide and with an arm 32, which lies between the spindles, see Figs. 3 and 5, and under the pinions and retains the removable spindle in place. When the slide is pulled outward, as in Fig. 5, boss 31 rides over the wall 26 of recess 25 and backward over the body, the spring of the metal permitting this movement. In this position of the slide, spindle 12 may be drawn downward, as indicated by dotted lines in Fig. 5, the pinion end swung toward the left and then the spindle, and the paddle carried thereby, may be removed from the frame, as there will be sufficient space between the finger piece of the slide and the contiguous angle lug on the frame to permit the spindle to be swung outward, as indicated in Fig. 6. The spindle may be readily replaced by reversing the above movements, and is then locked in place by pushing the slide forward.

As shown in the drawing, the paddles are made from single strips of metal. The lower ends of the spindles are squared, or made of other angular form in cross section, leaving shoulders 39 at the inner ends of the angular portions. The strips to form the paddles are provided at their midlength with openings corresponding with the angular portions. The extreme ends of the spindles are reduced and the ends of the strips are provided with holes through which the reduced ends are passed, the arms of the strips being curved substantially as shown, so as to produce paddles of an oval configuration. The ends of the strips are secured to the spindles by heading down the ends of the spindles as at 34.

In order to cover the vessel in which material is being beaten and to prevent spattering, I provide a cover plate 35, which is simply a disk of metal provided with a slit 36 extending inward from the edge, and with an approximately central, elongated recess 37 having an enlargement 38.

The cover plate is applied by springing the metal on opposite sides of the slot in opposite directions far enough to permit the spindles to be passed through the slit and into the central recess. Spindle 11, then lies at approximately the end of the recess, and spindle 12, lying in the enlargement, as will be readily understood from Fig. 1.

In use, the implement may be held as indicated in Fig. 1 or the headings 34 may be allowed to rest on the bottom of the vessel. The operation of beating eggs, cream or other material is the same as with ordinary beaters of this class. If it is desired to use one paddle, the spindle 12 is removed, as already described. In replacing spindle 12 the paddles should be placed substantially at right angles to each other, as shown in Fig. 3, in order to prevent interference.

Having thus described my invention, I claim:

1. An implement of the character described comprising a frame, a fixed spindle, a removable spindle, said spindle being provided with intermeshing pinions, and a driving wheel engaging pinion of the fixed spindle.

2. An implement of the character described comprising a sheet metal substantially U-shaped frame, a plurality of spindles rotatably mounted in the arms of the frame and provided with engaging driving pinions, and a driving means mounted on the frame and engaging one of said pinions.

3. An implement of the character described comprising a fixed spindle, a removable spindle, said spindles being provided with intermeshing pinions, driving means engaging the pinion of the fixed spindle, and a U-shaped frame, both arms of which provide supports for the spindles.

4. An implement of the character described comprising a U-shaped frame, a spindle fixed therein, a spindle removable therefrom, said spindles being provided with intermeshing spindles, driving means, and means for retaining the removable spindle in operative position.

5. An implement of the character described comprising a U-shaped frame, a spindle fixed therein, a spindle removable therefrom, said spindles being provided with intermeshing spindles, driving means, and a slide by which the removable spindle is retained in operative position.

6. An implement of the character described comprising a frame having an opening, a fixed spindle, a removable spindle, said spindles being provided with intermeshing pinions, and a slide provided with a boss adapted to engage the opening and an arm lying between the spindles by which the removable spindle is locked in operative position.

7. An implement of the character described comprising a fixed spindle, a removable spindle, said spindles being provided with intermeshing pinions, a U-shaped frame, the upper arm of which is engaged by both spindles and the lower arm of which comprises angular lugs having recesses to receive the spindles, and a slide having at one end an arm which locks the removable spindle in operative position and at the other end a finger piece which coöperates with the lugs to lock both spindles in operative position.

8. A paddle of the character described comprising a spindle having an angular portion at its lower end terminating in a shoulder, and a reduced end, and a strip having an opening at its midlength corresponding with the angular portion of the spindle and through which said angular portion is passed leaving the midlength of the strip bearing against the shoulder, the ends of the strip being provided with holes through which the reduced end of the spindle is passed and then headed down.

9. In an implement of the character described, the combination with two spindles of a cover plate having a slit extending inward from the edge and an elongated recess into which the slit extends and which is provided with an enlargement, one of said spindles being received by the recess and the other by the enlargement.

In testimony whereof I affix my signature.

JOHN M. FEENEY.